July 13, 1965  B. C. HAMLET  3,194,580
LEAF SPRING SUSPENSION SYSTEM WITH NO-LOAD
FEATURE AND AXLE ADJUSTMENT
Filed May 19, 1961  2 Sheets-Sheet 1
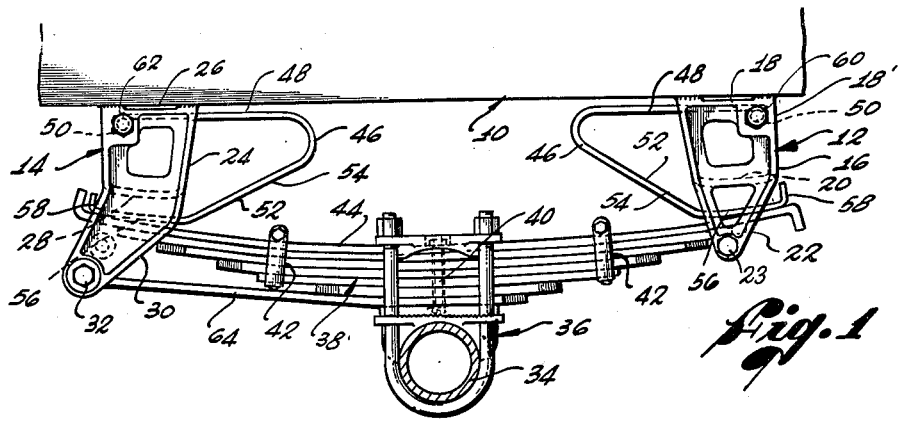
Fig. 1
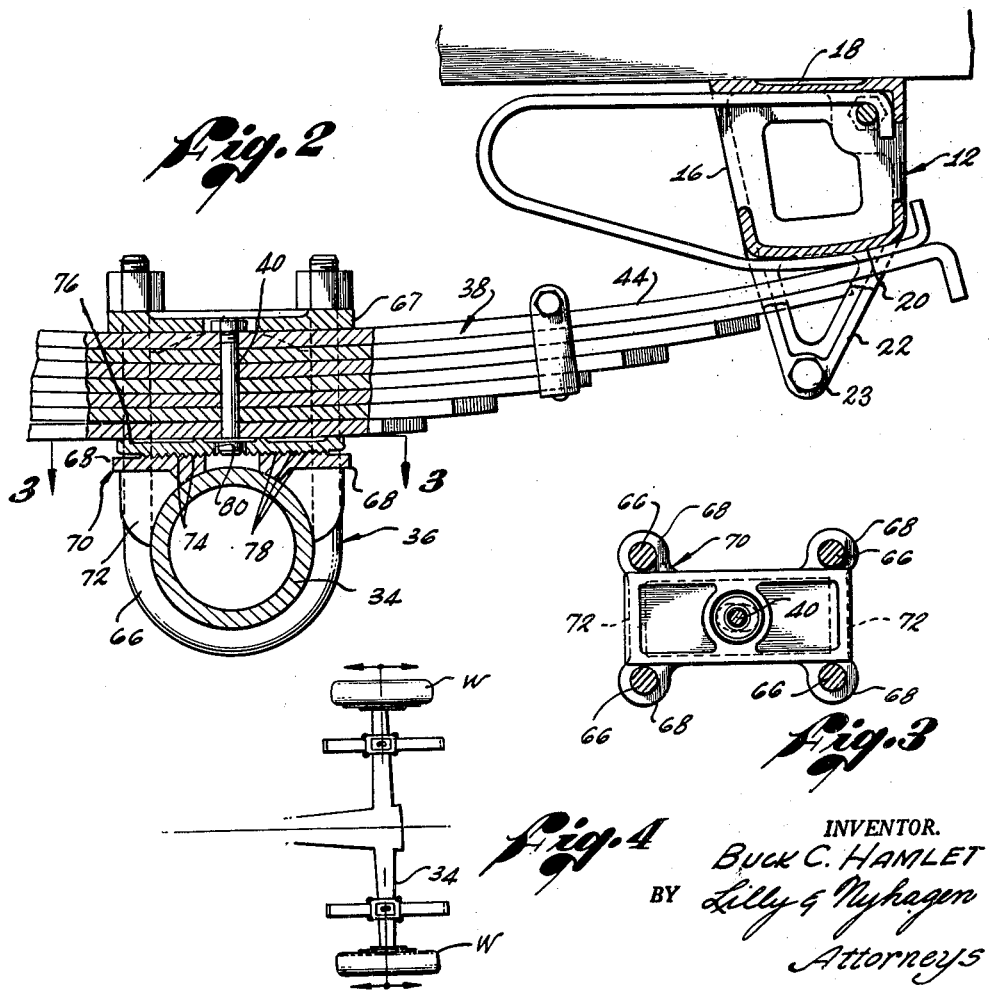
Fig. 2
Fig. 3
Fig. 4
INVENTOR.
BUCK C. HAMLET
BY Lilly & Nyhagen
Attorneys

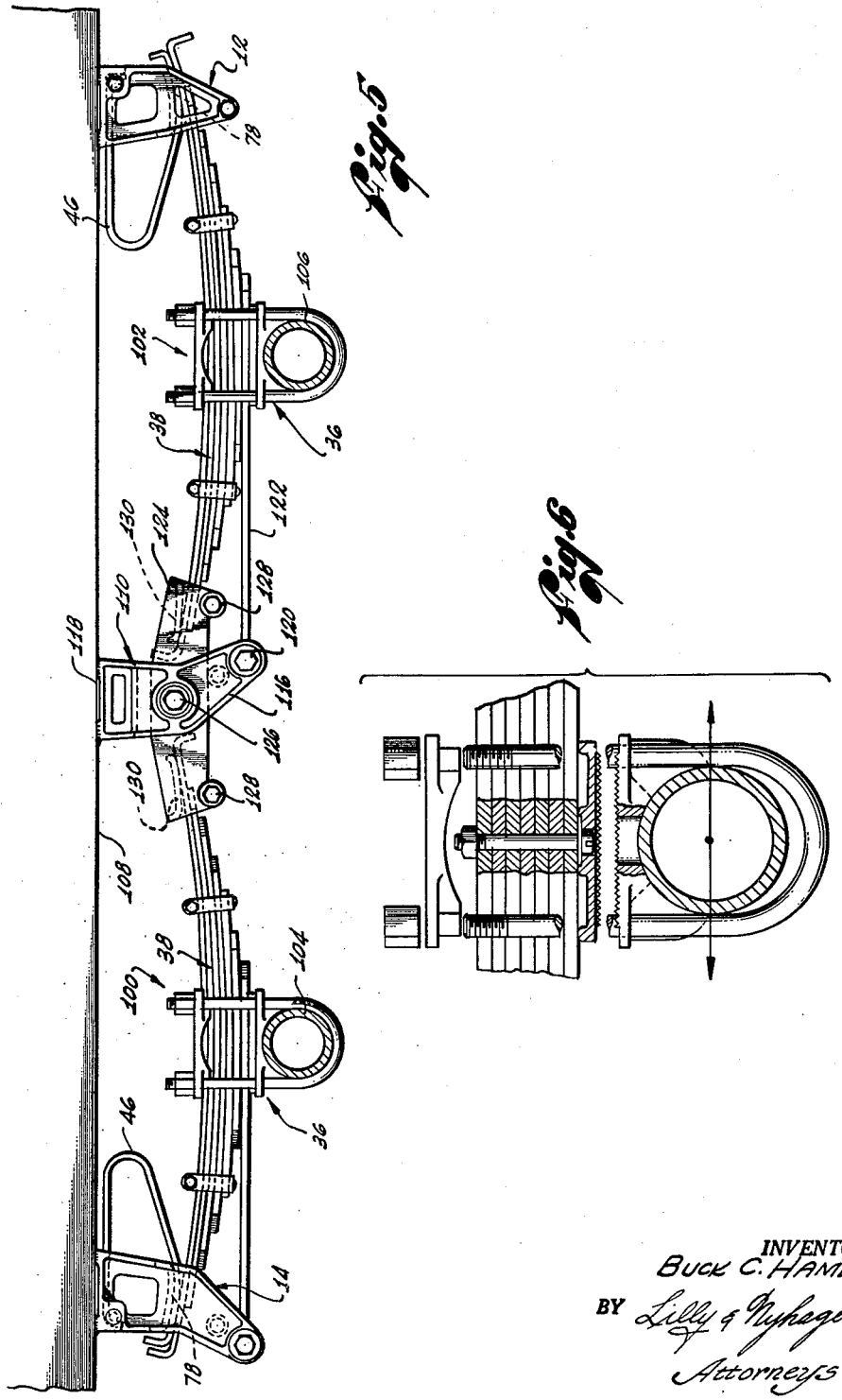

United States Patent Office 3,194,580
Patented July 13, 1965

3,194,580
LEAF SPRING SUSPENSION SYSTEM WITH NO-LOAD FEATURE AND AXLE ADJUSTMENT
Buck C. Hamlet, La Habra, Calif., assignor to Cambria Spring Company, Los Angeles, Calif., a corporation of California
Filed May 19, 1961, Ser. No. 111,211
11 Claims. (Cl. 280—104.5)

This invention relates generally to spring suspension systems for heavy vehicles, such as trucks and truck trailers, and, particularly, to an improved leaf spring suspension system for such vehicles embodying a no-load soft spring feature and an axle adjustment.

The conventional leaf spring suspension system for heavy vehicles, such as trucks and trailers, is made up of a plurality of leaf spring assemblies, each consisting of a leaf spring, the center of which is secured to an axle of the vehicle and the ends of which pass through spring hangers secured to the vehicle frame. These hangers have spring seats supported directly on the ends of the leaf spring. As a result, the several leaf springs furnish the sole spring support for the vehicle chassis.

Since the leaf springs must be capable of supporting the maximum weight which the vehicle can carry, they must be very stiff, that is, they must have a high spring rate. Accordingly, when the vehicle is only lightly loaded or completely unloaded, the leaf springs act as relatively rigid connections between the axles and chassis of the vehicle with the result that a very hard ride is experienced.

Another disadvantage of the existing leaf spring suspension systems for heavy vehicles is that accurate lateral alignment of the vehicle wheels, during initial assembly of the axles on the leaf springs or subsequent reassembly of the axles on the leaf spring following servicing which requires removal of the axle, is very difficult to achieve. The reason for this is that the wheels must be accurately aligned before attaching the spring hangers to the vehicle frame since there is no provision for adjusting the axle along the leaf spring after welding the spring hangers to the vehicle frame.

A general object of this invention is to provide a leaf spring assembly for heavy vehicles which avoids the above noted and other deficiencies of the existing leaf spring assemblies.

A more specific object of the invention is to provide a leaf spring assembly for vehicles which embodies light springs that cushion the vehicle chassis when the latter is unloaded or lightly loaded and stiff springs that cushion the chassis when the vehicle is heavily loaded.

Another object of the invention is to provide a leaf spring assembly of the character described which permits adjustment of the axle with respect to the leaf spring after installation of the assembly so as to facilitate alignment of the vehicle wheels.

A further object of the invention is to provide a leaf spring assembly of the character described which is suitable for single axle or tandem axle vehicles.

Yet a further object of the invention is to provide a leaf spring assembly of the character described which is simple in construction, economical to manufacture, easy to install, and otherwise ideally suited to its intended functions.

Other objects, advantages, and features of the invention will become readily evident as the description proceeds.

Briefly, the objects of the invention are attained by providing a leaf spring assembly equipped with a relatively stiff leaf spring, spring hangers for attachment to the vehicle frame and through which extend the ends of the spring leaf, the hangers having spring seats overlying the ends of the spring leaf, and a relatively light spring interposed between at least one hanger spring seat and the adjacent end of the spring leaf. When the vehicle is lightly loaded or unloaded, the vehicle chassis is supported on said one end of the leaf spring by the light spring which affords the vehicle with a softly cushioned ride.

When the vehicle is heavily loaded, the light spring yields until the spring seat is supported directly on the adjacent end of the main leaf spring. Under these conditions, the weight of the vehicle is supported directly on the main leaf spring which, therefore, affords the stiff spring action required for the heavy load.

The axle is made adjustable along the main leaf spring by means of a unique adjustable connection between the axle and leaf spring. After the wheels at the ends of this axle are properly aligned, the parts of the coupling are welded or otherwise rigidly secured together to lock the axle in its adjusted position. Thus, the present leaf spring suspension system can be secured to the vehicle frame before alignment of the wheels.

A better understanding of this invention may be had from the following detailed description thereof, taken in connection with the annexed drawings, wherein:

FIG. 1 is a side elevational view of the present leaf spring assembly installed on a single axle vehicle;

FIG. 2 is an enlarged view of the right-hand portion of the assembly in FIG. 1;

FIG. 3 is a view looking in the direction of the arrows 3—3 in FIG. 2;

FIG. 4 is a top plan view, on reduced scale, of a vehicle mounting two of the present leaf spring assemblies;

FIG. 5 illustrates the present leaf spring assembly installed on a tandem axle vehicle; and FIG. 6 is an enlarged detail, partially in section, illustrating how the axle can be adjusted along the leaf spring of the present leaf spring assembly.

In FIGS. 1-4 of these drawings, the numeral 10 denotes the frame of a single axle vehicle, such as a truck. Welded to this frame are two spring hangers 12 and 14. The rear hanger 12 comprises a relatively thin, flat casting including spaced, parallel side walls 16 bridged and joined at their upper ends by an integral end wall 18. At an intermediate position, side walls 16 are bridged and joined by an integral rib 20 which serves as a spring seat, as will presently be more fully discussed. Below the spring seat 20, the side walls 16 of the casting form downwardly tapered legs 22. The lower, pointed ends of these legs are joined by a bolt 23. The front hanger 14, like the rear hanger 12, comprises a casting having spaced, parallel side walls 24 which are bridged and joined at their upper ends by an integral end wall 26 and at an intermediate position by an integral rib 28 which serves as a spring seat. The downwardly tapered legs 30 of the hanger 14 are joined at their lower ends by a bolt 32.

Indicated at 34 is an axle of the vehicle which is located approximately midway between the spring hangers 12 and 14. Secured to this axle, by means 36 soon to be described, is a leaf spring 38. Leaf spring 38 is made up in the usual way of a plurality of spring leaves which become progressively longer toward the upper side of the spring leaf. The spring leaves are joined at the center by a bolt 40 and at positions between this bolt and the extreme ends of the spring leaf by clamps 42. The ends of the upper spring leaf 44 of leaf spring 38, as well as the ends of the next smaller leaf, extend between the legs 22 of the rear hanger 12 and between the legs 30 of the front hanger 14. As will presently be seen, the leaf spring 38 provides the stiff spring support for the vehicle when the latter is heavily loaded.

Indicated at 46 are two light load spring leaves which furnish the light spring support for the vehicle when the latter is lightly loaded or unloaded. Each spring leaf 46 is bent into a generally U shape and has one generally straight leg 48 terminating in a right angular bent end 50. The other leg 52 of the spring leaf 46 has a section 54 which inclines away from leg 48 and a second section 56 which is bent toward leg 48 at an obtuse angle to the section 54. Section 56 terminates in a right angle end 58.

The upper leg 48 of the rear spring leaf 46 extends between the side walls 16 of the rear spring hanger 12 and along the underside of the upper wall 18 of the hanger. The right angle bent end 50 of the spring seats against a right angle portion 18' of the rear hanger end wall 18. A bolt 60 is threaded in the hanger and extends across the space between the hanger side walls, in front of the spring end 50, to secure the spring leaf 48 in the hanger. End 56 of the other leg of the spring leaf 46 extends between the hanger legs 22 and seats against the upper side of the rear end of spring leaf 44. The forward light load spring leaf 46 is similarly positioned in the forward hanger 14 and secured to the latter hanger by means of the bolt 62. The lower end 56 of the spring leg 52 seats against the upper surface of the forward end of the spring leaf 44.

Indicated at 64 is a spring leaf, the forward end of which is rotatably mounted on the bolt 32. The rear end of the leaf 64 is attached to the center of the leaf spring 38 by means of the bolt 40. This latter spring leaf 64, commonly referred to as a radius rod, takes the fore and aft thrust on the spring assembly and maintains the axle position.

The light load spring leaves 46 are so proportioned and shaped that when the vehicle is lightly loaded, or carries no load, the legs 56 of the spring leaves 46 are held out of engagement with the spring seats 20 and 28 by the spring force of the spring leaves 46. Under these conditions, the frame 10 is supported on the front and rear ends of the leaf spring 38 by the relatively light load spring leaves 46. The main leaf spring 38 remains substantially undeflected under these light loads. Accordingly, the light spring leaves 46 provide the vehicle with a soft ride under no-load or light load conditions.

As the load on the vehicle is increased, the legs 48 and 52 of the spring leaves 46 are deflected toward one another until the ends 56 of the spring leaves rest against the spring seats 20 and 28 on the spring hangers 12 and 14. Under these conditions, the spring action of the spring leaves 46 is nullified and the weight of the vehicle is applied directly to the ends of the leaf spring 38. The relatively stiff leaf spring 38, therefore, furnishes the entire spring support for the vehicle.

It is evident, therefore, that under light or no-load conditions, the relatively light spring leaves 46 provide a soft spring suspension for the vehicle so as to afford the latter with a soft ride. When the vehicle is heavily loaded, the spring seats 20 and 28 rest directly on the ends of the relatively stiff leaf spring 38. Leaf spring 38, then, affords the vehicle with the stiff spring suspension system required for heavy loads.

The means 36 for attaching the axle 34 to the center of the leaf spring 38 will now be described by reference to FIG. 2. The numeral 66 denotes two conventional U bolts by which an axle is usually attached to the center of a leaf spring. U bolts 66 straddle the axle 34 and pass through a pressure plate 67 which seats against the upper side of spring leaf 44. Nuts are threaded on the U bolts as shown. Welded or securely attached to the axle 34 and having apertured bearing projections 68 slidably fitted on the legs of the U bolts 66 is a spring seat 70. At the underside of this seat are two flanges which are circularly relieved to form saddles 72 for seating on the axle. The upper surface of the spring seat 70 is formed with teeth or serrations 74 which parallel the axle 34.

Seating against the underside of the bottom leaf of leaf spring 38 is a second pressure plate 76 having serrations 78 meshing with the serrations 74 on the seat 70. The pressure plate 76 has a central hole 80 receiving the head of bolt 40 for locating the upper bearing plate on the leaf spring 38.

When installing the present leaf spring assembly on the vehicle frame 10, the rear and forward spring hangers 12 and 14 are first located in approximately the correct positions on the frame and are then welded to the frame. The leaf spring 38 and the radius rod 64 are then installed in the hangers. Finally, the axle 34 is attached to the leaf spring 38 by the connecting means 36. In FIG. 4, it will be seen that each end of the axle 34 is connected to the frame by one of the present leaf spring assemblies.

After both the spring assemblies have been attached to the vehicle frame 10 and the axle 34 has been attached to both leaf spring assemblies, one or both ends of the axle are shifted along their respective leaf spring assembly to align the wheels W at the ends of the axle. The end of the axle is shifted, in this way, by loosening the nuts on the U bolts 66 to disengage the serrations 74 and 78 on the seat 70 and plate 76. During shifting of the end of the axle along the leaf spring 38, of course, the upper plate 76 remains in a fixed position on the leaf spring owing to the engagement of the head of bolt 40 in the central hole 80 of the upper plate.

After each end of the axle is properly located, the nuts on the U bolts 66 are tightened, thereby forcing the seat 70 and plate 76 into contact with their serrations 74 and 78 in meshing engagement, to tightly clamp the axle 34 to the leaf spring 38. The seat 70 and pressure plate 76 are then usually welded together to firmly secure the parts in fixed position.

If, during subsequent servicing, it is necessary to remove the axle and, after the installation of the axle, to again align the wheels between the pressure plates, the weld between the pressure plates must be removed or new pressure plates used to permit adjustment of the spring seat 70 with respect to the pressure plate 76. It is clear, therefore, that the invention provides a unique and simple means for aligning the wheels of the vehicle.

In the tandem axle arrangement illustrated in FIG. 5, two leaf spring assemblies 100 and 102 are used for resiliently supporting the two axles 104 and 106 on the vehicle frame 108. Between the two leaf spring assemblies is an equalizer bracket or hanger 110. The portion of the leaf spring assembly 100 to the left of the equalizer bracket 110 is identical to the portion of the spring leaf assembly to the left of the rear spring hanger 12 in FIG. 1. Similarly, the portion of the rear leaf spring assembly 102 to the right of the equalizer bracket 110 is identical to the portion of the leaf spring assembly to the right of the forward spring hanger 14 in FIG. 1. Accordingly, these portions of the leaf spring assemblies 100 and 102 in FIG. 5 will not be described in detail except to say that the forward spring hanger 14 which supports the forward or left-hand end of the leaf spring assembly 100 in FIG. 5 is identical to the forward spring hanger 14 in FIG. 1 and, like the latter hanger, is swelded to the vehicle frame 108. Similarly, the rear or right-hand spring hanger 12 in FIG. 5 is identical to the rear spring hanger 12 in FIG. 1 and, like the latter hanger, is welded to the frame 108.

Equalizer bracket 110 comprises a casting formed with spaced, parallel side walls 116 which are rigidly joined at their upper ends by an integral end wall 118. The lower, tapered ends of the side walls 116 are joined by a bolt 120. Rotatable on this bolt is the left-hand end of the radius rod 122, the right-hand end of which is secured to the center of the leaf spring assembly 102 like the radius rod 64 in FIG. 1.

Rotatably fitted between the side walls 116 of equalizer bracket 110 is the equalizer 124. This equalizer is pivotally mounted intermediate its ends on the side walls 116 by means of a bolt 126. Equalizer 124 has a generally inverted U shape and receives the rear or right-hand end of the leaf spring of assembly 100 and the left-hand end of the leaf spring of assembly 102. Bolts 128 extend across the equalizer below these ends of the leaf springs. Equalizer 124 comprises a casting integrally formed with interior ribs 130 which seat against the ends of the leaf springs.

In precisely the same manner as described in connection with the leaf spring assembly of FIG. 1, when the vehicle is lightly loaded, the frame 108 is supported on the forward end of the forward leaf spring assembly 100 and the rear end of the rear leaf spring assembly 102 through the light load springs 46. Under these conditions, then, the light load springs 46 provide the main spring action between the vehicle frame 108 and the axles 104 and 106 so as to provide the vehicle with a soft ride. When the vehicle is heavily loaded, the spring seats 78 of hangers 12 and 14 rest directly on the forward end of the forward leaf spring 38 and on the rear end of the rear leaf spring 38, as described in more detail earlier. Under these conditions, the leaf springs 38 provide the main spring action between the vehicle frame 108 and the axles 104 and 106 so as to provide the vehicle with a relatively stiff spring suspension system as required for the heavy loads.

The axles 104 and 106 in FIG. 5 are secured to their respective leaf springs by the means 36 described earlier. Thus, each of the axles 104 and 106 is adjustable along their respective leaf springs to facilitate alignment of the wheels on the ends of the axles, in the manner described earlier.

Clearly, therefore, the invention herein described and illustrated is fully capable of attaining the objects and advantages preliminarily set forth. While two presently preferred embodiments of the invention have been disclosed for illustrative purpose, numerous modifications in the design, arrangement of parts, and instrumentalities of the invention are clearly possible within the spirit and scope of the following claims.

What is claimed is:

1. A spring assembly for an automotive vehicle, comprising a leaf spring, an axle support at the center of said leaf spring, spring hangers at the ends, respectively, of said spring adapted for attachment to the vehicle frame, at least one of said hangers including a rigid spring seat over the adjacent end of the spring, and a relatively light auxiliary spring carried by said one hanger and interposed between said spring seat and said adjacent spring end for yieldably resisting relative movement of said latter spring end toward said seat.

2. A spring assembly for an automotive vehicle, comprising a leaf spring, an axle support at the center of said leaf spring, spring hangers at the ends, respectively, of said spring adapted for attachment to the vehicle frame, at least one of said hangers including a rigid spring seat over the adjacent end of the spring, and a relatively light auxiliary spring leaf fixed at one end to said one hanger and having its other end interposed between said spring seat and said adjacent spring end for yieldably resisting relative movement of said latter spring end toward said spring seat.

3. A spring assembly for an automotive vehicle, comprising a leaf spring, an axle support at the center of said leaf spring, spring hangers at the ends, respectively, of said spring, each spring hanger including an upper end for attachment to the vehicle and at least one hanger including a lower rigid spring seat over the adjacent end of said spring, and a relatively light, generally U-shaped auxiliary spring leaf secured at one end to the upper end of said one hanger and having its other end interposed between said spring seat and said adjacent spring end for yieldably resisting relative movement of said latter spring end toward said seat.

4. A spring assembly for an automotive vehicle, comprising a leaf spring, an axle support at the center of said leaf spring, spring hangers at the ends, respectively, of said spring, at least one of said hangers including an upper end for attachment to the vehicle, side members which straddle the adjacent end of said leaf spring, and a lower rigid spring seat bridging said side members above the adjacent end of said spring, and a relatively light, generally U-shaped auxiliary spring leaf secured at one end to the upper end of said one hanger and having its other end interposed between said spring seat and said adjacent spring end for yieldably resisting relative movement of the latter spring end toward said spring seat.

5. A spring assembly for an automotive vehicle, comprising a leaf spring, an axle support at the center of said leaf spring, spring hangers at the ends, respectively, of said spring, at least one of said hangers including an upper end for attachment to the vehicle, side members which straddle the adjacent end of said leaf spring, a wall bridging said side members at the upper end of said one hanger, and a lower rigid spring seat bridging said side members above the adjacent end of said spring, a relatively light, generally U-shaped auxiliary spring leaf having one end fitted between the upper ends of said side members and seating against the underside of said wall and its other end interposed between said seat and said adjacent spring end for yieldably resisting relative movement of said latter spring end toward said spring seat, and means securing said one end of said auxiliary leaf to said one hanger.

6. A spring assembly for an automotive vehicle, comprising a leaf spring, an axle support at the center of said leaf spring, a spring hanger at each end of said leaf spring including a rigid spring seat over the adjacent end of the leaf spring, and a relatively light auxiliary spring carried by each spring hanger and interposed between the spring seat of the respective hanger and the adjacent end of said leaf spring for yieldably resisting relative movement of each end of the leaf spring toward its adjacent spring seat.

7. A spring assembly for an automotive vehicle, comprising a leaf spring, an axle support at the center of said leaf spring, a spring hanger at each end of said leaf spring having an upper end for attachment to the vehicle and including side members which straddle the adjacent end of the leaf spring, a wall bridging said side members at the upper end of the respective hanger, and a lower spring seat bridging said side members above said adjacent spring end, and a relatively light, generally U-shaped auxiliary spring leaf having one end positioned between the upper ends of the side members of each hanger and seating against the underside of said wall of the respective hanger and having its other end interposed between the spring seat of the respective hanger and the adjacent end of the first leaf spring for yieldably resisting relative movement of each end of said first leaf spring toward its adjacent spring seat.

8. A spring assembly for an automotive vehicle, comprising a pair of leaf springs arranged in tandem, an equalizer bracket operatively connecting the adjacent ends of said leaf springs, spring hangers supported at the other ends, respectivley, of said leaf springs, each of said spring hangers including a rigid spring seat above the adjacent end of the respective leaf spring, and a relatively light auxiliary spring connected to each spring hanger and interposed between the spring seat of the respective hanger and the adjacent end of the respective leaf spring for yieldably resisting relative movement of said other ends of said leaf springs toward their adjacent spring seats.

9. A leaf spring assembly for an automotive vehicle, comprising a pair of leaf springs arranged in tandem, an equalizer bracket operatively connecting the adjacent ends of said leaf springs, spring hangers at the other ends, respectively, of said leaf springs, each spring hanger having an upper end for attachment to the vehicle and including side members which straddle the adjacent end of its respective leaf spring, a wall bridging the upper ends of said side members, and a lower rigid spring seat bridging said side members above the adjacent end of the respective leaf spring, and a relatively light, generally U-shaped auxiliary spring leaf for each spring hanger, each auxiliary spring having one end positioned between the upper ends of the side members and seating against the wall of its respective spring hanger and having its other end interposed between the spring seat of its respective spring hanger and the adjacent end of the respective first leaf spring for yieldably resisting relative movement of said other ends of said leaf springs toward said spring seats.

10. A spring hanger for an automotive vehicle, comprising a pair of spaced, generally parallel side members having normally upper and lower ends, a rigid spring seat bridging said side members adjacent and facing the lower ends thereof, and a spring leaf having one end secured between the upper ends of said side members and having its lower end positioned between said side members below and in normally spaced relation to said spring seat.

11. A spring hanger for an automotive vehicle, comprising a pair of spaced, generally parallel side members having normally upper and lower ends, a wall bridging the upper ends of said side members, a spring seat bridging said side members adjacent and facing the lower ends of said side members, a generally U-shaped spring leaf having one end positioned between the upper ends of said side members and seating against the undersurface of said wall and having its other end positioned between said side members below and in spaced relation to said seat, and means securing said one end of said spring to said hanger.

References Cited by the Examiner
UNITED STATES PATENTS

| | | | |
|---|---|---|---|
| 1,018,250 | 2/12 | McIntyre | 265—52 |
| 1,067,480 | 7/13 | Hoover | 265—52 |
| 1,564,416 | 12/25 | Holloway | 267—46 |
| 1,858,930 | 5/32 | Hoover | 267—46 |
| 2,577,322 | 12/51 | Frazier | 280—104.5 |
| 2,653,035 | 9/53 | Ward | 280—104.5 |
| 2,861,797 | 11/58 | Norrie | 267—56 X |

A. HARRY LEVY, *Primary Examiner.*

GEORGE HYMAN, JR., PHILIP ARNOLD, *Examiners.*